United States Patent
Stevens et al.

(10) Patent No.: US 9,970,311 B2
(45) Date of Patent: May 15, 2018

(54) CONSUMABLE ASSEMBLY TOOL FOR A GAS TURBINE ENGINE

(71) Applicant: United Technologies Corporation, Hartford, CT (US)

(72) Inventors: Michael S. Stevens, Alfred, ME (US); Jeremy Drake, South Berwick, ME (US); Brian Duguay, Berwick, ME (US); Timothy M. Davis, Kennebunk, ME (US); Ryan M. Kohn, Kennebunk, ME (US); Dairus D. McDowell, Shapleigh, ME (US); Brian McLaughlin, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/198,049

(22) Filed: Mar. 5, 2014

(65) Prior Publication Data
US 2014/0255167 A1 Sep. 11, 2014

Related U.S. Application Data

(60) Provisional application No. 61/772,895, filed on Mar. 5, 2013.

(51) Int. Cl.
| F01D 25/28 | (2006.01) |
| F01D 11/12 | (2006.01) |
| F01D 25/00 | (2006.01) |
| B23P 15/00 | (2006.01) |

(52) U.S. Cl.
CPC ............. *F01D 11/12* (2013.01); *F01D 25/00* (2013.01); *F01D 25/285* (2013.01); *B23P 15/008* (2013.01); *F05D 2230/64* (2013.01); *F05D 2300/43* (2013.01); *Y10T 29/4932* (2015.01); *Y10T 156/10* (2015.01)

(58) Field of Classification Search
CPC ............. F05D 2230/60; F05D 2230/64; F05D 2230/642; F05D 2230/644; F05D 2230/52; F05D 2240/14; F05D 2240/90; F05D 2240/91; F05D 2260/30; F05D 2300/43; F05D 2240/11; B23P 15/008; F01D 11/12; F01D 25/285; F01D 25/243; F01D 25/246; F01D 25/28
See application file for complete search history.

(56) References Cited

U.S. PATENT DOCUMENTS

| 4,162,040 A * | 7/1979 | Carey ............... F02K 9/976 239/265.33 |
| 6,393,331 B1 | 5/2002 | Chetta et al. |
| 6,682,300 B2 * | 1/2004 | Bolms ............... F01D 11/005 415/139 |
| 6,883,807 B2 * | 4/2005 | Smed ............... F01D 11/005 277/641 |
| 7,441,331 B2 | 10/2008 | Hudson et al. |
| 7,941,920 B2 | 5/2011 | Thompson et al. |
| 8,052,385 B2 | 11/2011 | Thompson et al. |
| 8,303,247 B2 | 11/2012 | Schlichting et al. |

(Continued)

Primary Examiner — Christopher Besler
(74) *Attorney, Agent, or Firm* — O'Shea Getz P.C.

(57) ABSTRACT

A method of assembling a gas turbine engine is provided that includes locating a consumable assembly tool within the engine. The consumable assembly tool is attached to another component of the gas turbine engine. The engine is run to vaporize the consumable assembly tool.

21 Claims, 5 Drawing Sheets

(56) References Cited

U.S. PATENT DOCUMENTS

| | | |
|---|---|---|
| 8,651,497 B2 | 2/2014 | Tholen et al. |
| 8,790,067 B2 | 7/2014 | McCaffrey et al. |
| 2003/0209589 A1* | 11/2003 | Hasz ........................ C23C 26/02 228/165 |
| 2007/0048142 A1* | 3/2007 | Dambrine ................ F01D 5/288 416/219 R |
| 2011/0232833 A1* | 9/2011 | Collins ................. F01D 11/127 156/165 |
| 2012/0099978 A1* | 4/2012 | Beyer ...................... B23P 15/04 415/197 |
| 2012/0243995 A1* | 9/2012 | Bunker ..................... F01D 5/18 416/95 |
| 2013/0256386 A1* | 10/2013 | Schacht ................ B23K 1/0018 228/44.3 |
| 2014/0127006 A1 | 5/2014 | Romanov et al. |
| 2014/0154062 A1* | 6/2014 | Weber ..................... F01D 11/00 415/174.4 |
| 2014/0212262 A1 | 7/2014 | Harris |
| 2014/0212275 A1* | 7/2014 | Abadie ................. F01D 17/162 415/151 |

* cited by examiner

CONSUMABLE ASSEMBLY TOOL FOR A GAS TURBINE ENGINE

This application claims priority to U.S. Patent Appln. No. 61/772,895 filed Mar. 5, 2013.

BACKGROUND

The present disclosure relates to a gas turbine engine and, more particularly, to tooling therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Some engine architectures may include snap rings to axially constrain components within a case assembly. Installation of the snap ring requires the component axially constrained thereby to be pushed away from the snap ring groove to provide clearance to seat the snap ring. In some instances the component is pushed to flex a flexible component such as seal. The flexible component typically accommodates some compression during engine operation, however, in some instances compression from assembly may be greater than the expected operational compression which could yield the flexible component.

SUMMARY

A method of assembling a gas turbine engine according to one disclosed non-limiting embodiment of the present disclosure includes locating a consumable assembly tool within the engine.

A further embodiment of the present disclosure includes running the engine to vaporize the consumable assembly tool.

A further embodiment of any of the foregoing embodiments of the present disclosure includes gluing the consumable assembly tool within the engine.

A further embodiment of any of the foregoing embodiments of the present disclosure includes gluing the consumable assembly tool within the engine as a multiple of segments.

A further embodiment of any of the foregoing embodiments of the present disclosure includes gluing the consumable assembly tool within the engine as a full hoop.

A further embodiment of any of the foregoing embodiments of the present disclosure includes gluing the consumable assembly tool to a component prior to assembly of the component into the engine.

A further embodiment of any of the foregoing embodiments of the present disclosure includes gluing the consumable assembly tool to a multiple of components prior to assembly of the multiple of components as a unit into the engine.

A further embodiment of any of the foregoing embodiments of the present disclosure includes locating the consumable assembly tool to operate as an assembly stop.

A further embodiment of any of the foregoing embodiments of the present disclosure includes locating the consumable assembly tool within an axially movable assembly of the engine to operate as an assembly stop for the axially movable assembly.

A further embodiment of any of the foregoing embodiments of the present disclosure includes locating the consumable assembly tool adjacent to a Blade Outer Air Seal (BOAS) assembly to operate as an assembly stop.

A further embodiment of any of the foregoing embodiments of the present disclosure includes locating the consumable assembly tool adjacent to a flexible component.

A further embodiment of any of the foregoing embodiments of the present disclosure includes locating the consumable assembly tool adjacent to a W-seal.

A further embodiment of any of the foregoing embodiments of the present disclosure includes locating the consumable assembly tool within an axially movable assembly of the engine.

An assembly for a gas turbine engine according to another disclosed non-limiting embodiment of the present disclosure includes a consumable assembly tool adjacent to the component.

A further embodiment of any of the foregoing embodiments of the present disclosure includes, wherein the consumable assembly tool is manufactured of a Polymer.

A further embodiment of any of the foregoing embodiments of the present disclosure includes, wherein the consumable assembly tool is manufactured of a polyethylene.

A further embodiment of any of the foregoing embodiments of the present disclosure includes, wherein the consumable assembly tool is glued to the component.

A further embodiment of any of the foregoing embodiments of the present disclosure includes, wherein the consumable assembly tool includes a full hoop ring.

A further embodiment of any of the foregoing embodiments of the present disclosure includes, wherein the consumable assembly tool includes a multiple of segments.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
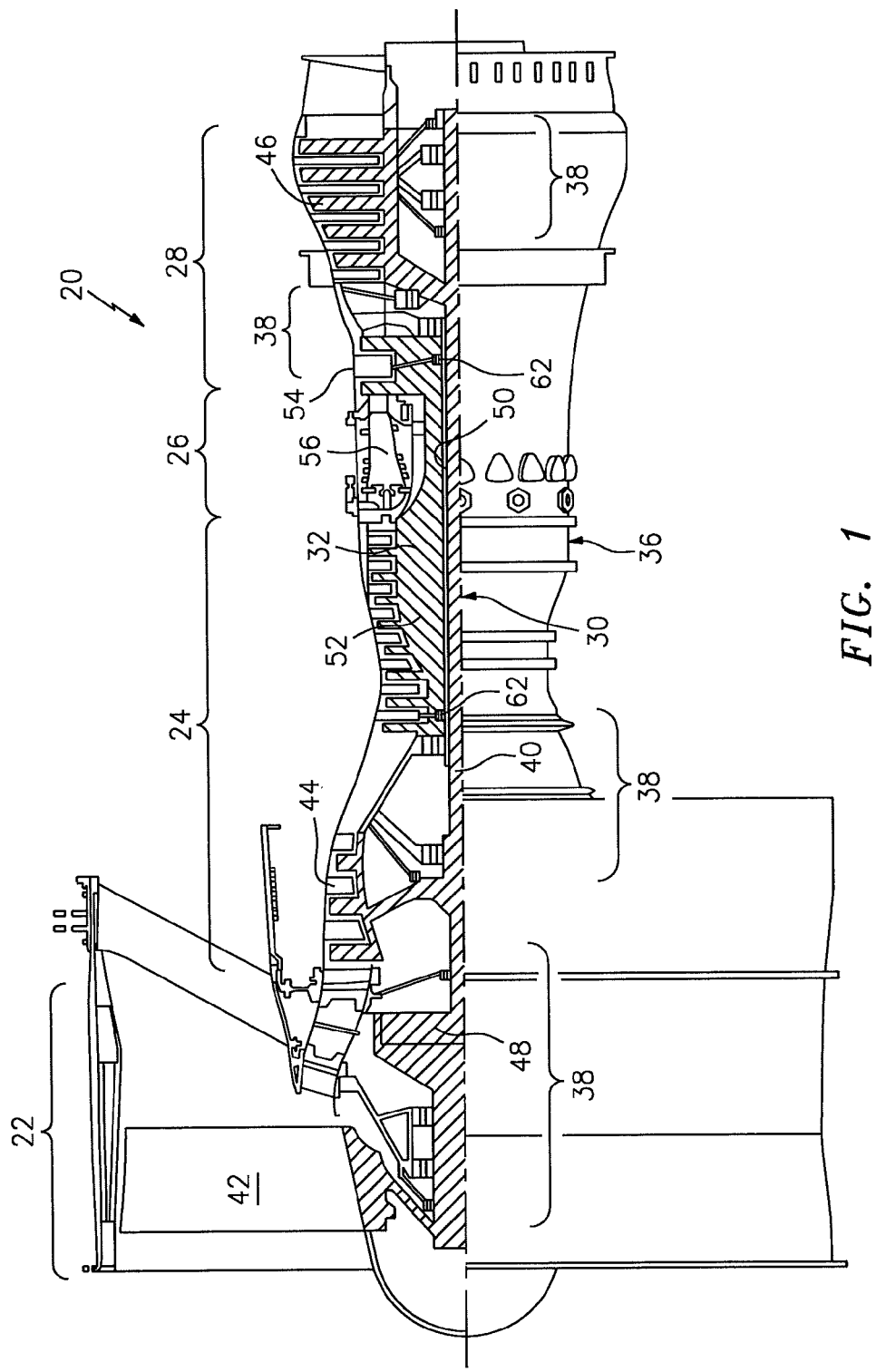
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section (not shown) among other systems or features. The fan section 22 drives air along a bypass flowpath while the compressor section 24 drives air along a core flowpath for compression and communication into the combustor section 26 then expansion thru the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine case structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or thru a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

In one example, the gas turbine engine 20 is a high-bypass geared aircraft engine with a bypass ratio greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds which can increase the operational efficiency of the LPC 44 and LPT 46 to render increased pressure in a relatively few number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans, where the rotational speed of the fan 42 is the same (1:1) of the LPC 44.

In one example, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The relatively low Fan Pressure Ratio according to one example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one example gas turbine engine 20 is less than about 1150 fps (351 m/s).

Figure 2:
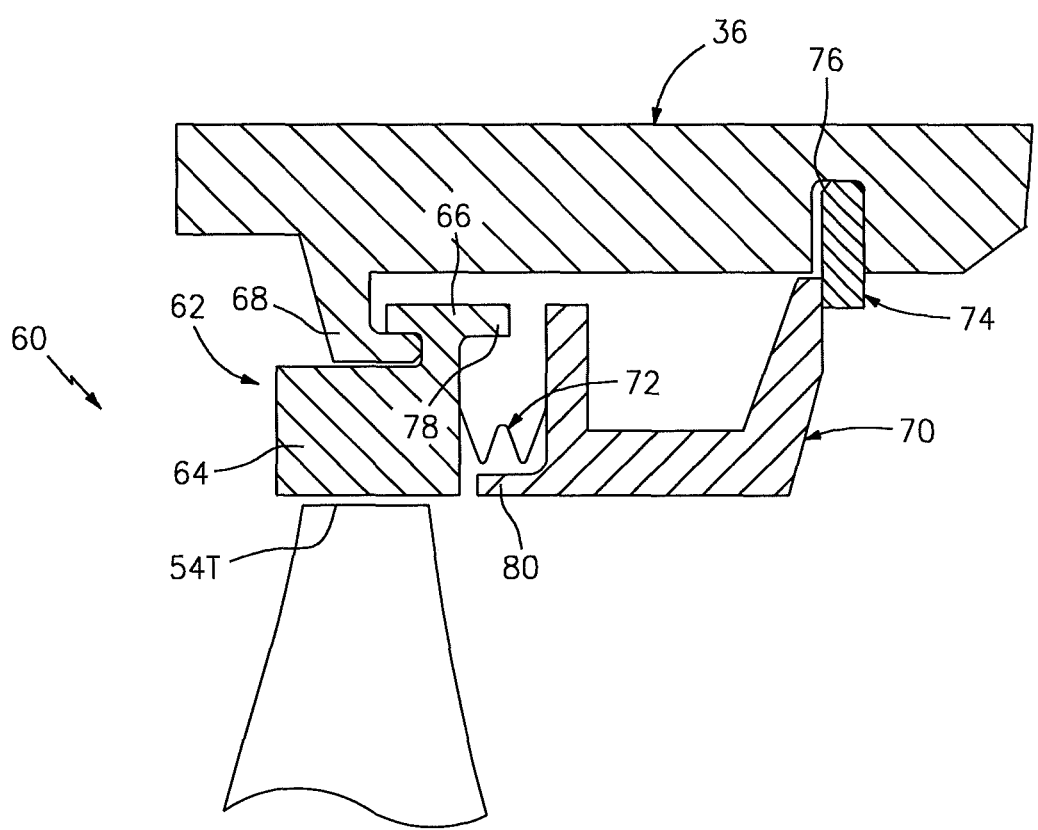
FIG. 2 is a partial expanded cross-section view of an axially movable assembly of a gas turbine engine.

With reference to FIG. 2, the engine 20 includes an axially movable assembly 60 such as a Blade Outer Air Seal (BOAS) assembly to provide an outer core gas path seal. The axially movable assembly 60 is disposed in an annulus radially between the engine case structure 36 and airfoil tips 54T of, for example, the HPT 54. Combustion exhaust gasses, from the combustor section 26 expand in the turbine section 28 and produce pressure gradients, temperature gradients and vibrations. The axially movable assembly 60 is supported to provide for relative movement to accommodate expansion caused by changes in pressure, temperature and vibrations encountered during operation of the gas turbine engine 10. It should be understood that although a BOAS assembly for the HPT 54 is illustrated in the disclosed non-limiting embodiment, axially movable components are located throughout the engine 20.

The axially movable assembly 60 in the disclosed non-limiting embodiment generally includes a multiple of circumferentially distributed BOAS segments 62 (one shown). Each BOAS segment 62 includes a body 64 with an interface 66 that engages a flange 68 from the engine case structure 36. It should also be understood that various interfaces and BOAS assemblies may alternatively be provided.

Each BOAS segment 62 is mounted axially adjacent to a component 70 through a flexible component 72 such as a W-seal, spring, gasket, thin sheet metal part, or other component. The component 70 may be a vane ring or other structure within the engine case structure 36. The component 70 is axially retained within the engine case structure 36 with a retainer 74 such as a snap ring. That is, the flexible component 72 forces the BOAS segments 62 away from the component 70 such that the BOAS segment 62 is axially constrained by the engagement of the interface 66 with the flange 68 and the component 70 is axially constrained by the retainer 74. The BOAS segments 62 and component 70 are thereby supported for relative axial movement.

To assemble the axially movable assembly 60, the interface 66 of the BOAS segments 62 are engaged with the flange 68, then the flexible component 72 and component 70 are axially positioned such that the retainer 74 is positioned within a groove 76 in the engine case structure 36.

Installation of the retainer 74 requires the component 70 axially constrained thereby to be pushed away from the groove 76 to provide clearance to seat the retainer 74. In some instances the component 70 may be pushed to flex the flexible component 72. The flexible component 72 typically accommodates some compression during engine operation. In some instances the assembly compression may be greater than the expected operational compression which could yield the flexible component 72 as the flanges 78, 80 between the respective BOAS segments 62 and the component 70 provide an operational clearance for thermal excursions which result in a more significant clearance at ambient.

Figure 3:
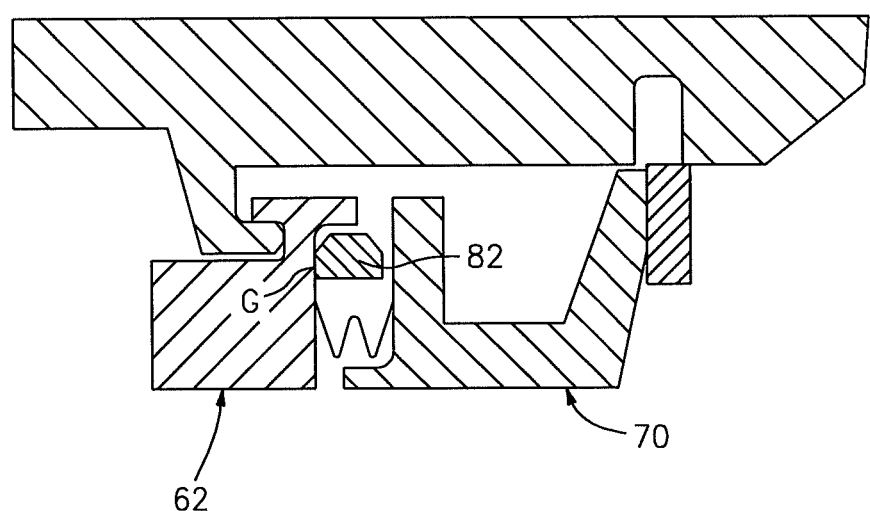
FIG. 3 is a partial expanded cross-section view of an axially movable assembly of a gas turbine engine with a consumable assembly tool in place.
Figure 4:
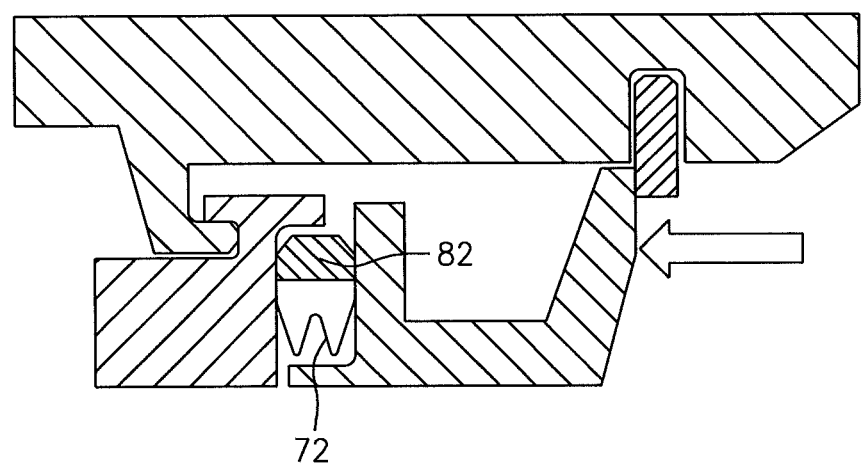
FIG. 4 is a partial expanded cross-section view of an axially movable assembly of a gas turbine engine with a consumable assembly tool in place during assembly.

With reference to FIG. 3, to avoid the assembly compression from being greater than the expected operational compression, a consumable assembly tool 82 is mounted between the BOAS segments 62 and the component 70. The consumable assembly tool 82 may be sized to permit the component 70 to flex the flexible component 72 upon insertion of a retainer into the groove 76 without yielding of the flexible component 72 (FIG. 4). That is, the flexible component 72 avoids potential damage. The consumable assembly tool 82 may be particularly useful when assembly is blind and the flexible component 72 cannot later be inspected.

The consumable assembly tool 82 is manufactured of low density material which vaporizes when the engine 20 is first run. That is, the consumable assembly tool 82 is essentially a sacrificial tool. The low-density material may be, in one example, a Polymer such as polyethylene that vaporizes at approximately 600 F (315 C) that is well within the operational temperatures of the HPT 54. The consumable assembly tool 82 will leave no residue or trace evidence after vaporization.

Figure 5:
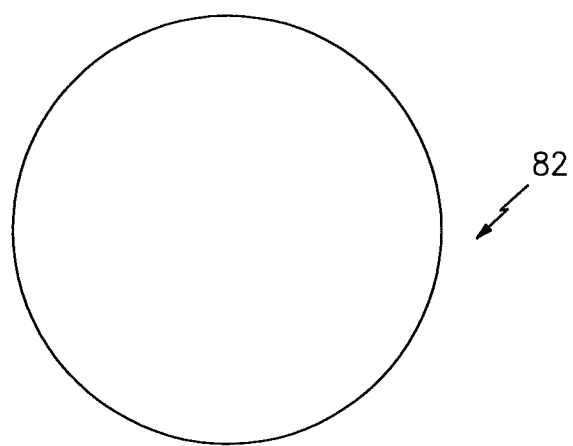
FIG. 5 is a face view of a consumable assembly tool according to one disclosed non-limiting embodiment.
Figure 6:
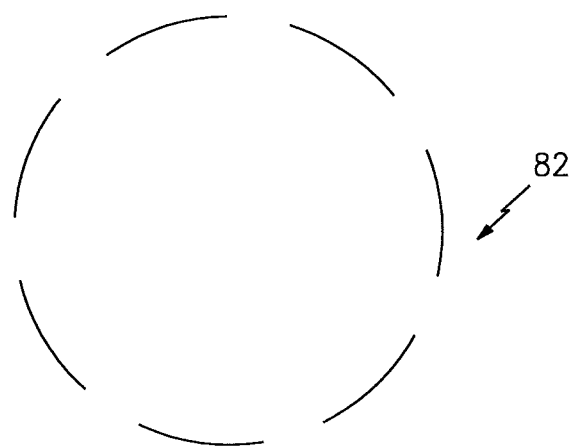
FIG. 6 is a face view of a consumable assembly tool according to another disclosed non-limiting embodiment.

The consumable assembly tool 82 may be a full hoop (FIG. 5) or numerous segments (FIG. 6). The consumable assembly tool 82 may be attached to the BOAS segments 62 with a glue such as a cyanoacrylate glue or wax at an example glue location G to facilitate assembly. That is, each segment or the full hoop consumable assembly tool 82 may be attached to the BOAS segments 62 with glue material that also vaporizes when the engine 20 is run-in.

Attachment of the consumable assembly tool 82 also facilitates assembly as, for example, the separate segments of the BOAS component 62 may be retained together as a ring by the consumable assembly tool 82 glued thereto. The consumable assembly tool 82 as a full hoop allows for support as well as protection of the flexible component 72 even when the component to be pushed into place is segmented.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of assembling a gas turbine engine, comprising:
    locating a consumable assembly tool within the engine, wherein the consumable assembly tool is a consumable component of the gas turbine engine;
    gluing the consumable assembly tool to another component of the gas turbine engine; and
    running the engine to completely vaporize the consumable assembly tool;
    wherein the consumable assembly tool comprises a polymer; and
    wherein the consumable assembly tool is a wholly discretely formed body.

2. The method as recited in claim 1, wherein the gluing of the consumable assembly tool occurs within the engine.

3. The method as recited in claim 1, wherein the gluing the consumable assembly tool occurs within the engine as a multiple of segments.

4. The method as recited in claim 1, wherein the gluing of the consumable assembly tool occurs within the engine as a full hoop.

5. The method as recited in claim 1, wherein the gluing of the consumable assembly tool to the other component of the gas turbine engine occurs prior to assembly of the other component into the engine.

6. The method as recited in claim 1, wherein the other component is one of a plurality of other components to which the consumable assembly tool is glued prior to assembly of the multiple of components as a unit into the engine.

7. The method as recited in claim 1, further comprising locating the consumable assembly tool to operate as an assembly stop.

8. The method as recited in claim 1, further comprising locating the consumable assembly tool within an axially movable assembly of the engine to operate as an assembly stop for the axially movable assembly.

9. The method as recited in claim 1, further comprising locating the consumable assembly tool adjacent to a Blade Outer Air Seal (BOAS) assembly to operate as an assembly stop, wherein the Blade Outer Air Seal (BOAS) assembly comprises the other component.

10. The method as recited in claim 1, further comprising locating the consumable assembly tool adjacent to a flexible component.

11. The method as recited in claim 1, further comprising locating the consumable assembly tool adjacent to a W-seal.

12. The method as recited in claim 1, further comprising locating the consumable assembly tool within an axially movable assembly of the engine.

13. The method as recited in claim 1, wherein the polymer comprises polyethylene.

14. The method as recited in claim 1, wherein the consumable assembly tool is configured to be vaporized during a first running of the gas turbine engine.

15. A method, comprising:
   disposing glue onto the consumable assembly tool;
   locating a consumable assembly tool within a gas turbine engine, the consumable assembly tool comprising a polymer, wherein the consumable assembly tool is a wholly discretely formed body; and
   running the gas turbine engine, the consumable assembly tool being completely consumed during the running of the gas turbine engine.

16. The method as recited in claim 15, wherein the running of the gas turbine engine is a first running of the gas turbine engine.

17. The method as recited claim 15, wherein the polymer comprises polyethylene.

18. The method as recited in claim 15, further comprising gluing the consumable assembly tool within the gas turbine engine.

19. A method of assembling a gas turbine engine, comprising:
   receiving a consumable assembly tool comprising a polymer; and
   arranging the consumable assembly tool within a turbine section of the gas turbine engine, wherein the consumable assembly tool is a wholly discretely formed body;
   wherein glue is disposed on the consumable assembly tool; and
   wherein the consumable assembly tool is completely consumed during nominal operation of the gas turbine engine.

20. The method of claim 1, wherein the consumable assembly tool is formed as a self-supporting body, and the consumable assembly tool is configured to be completely vaporized within the normal operating temperatures of the engine.

21. The method as recited in claim 1, wherein the running of the gas turbine engine is a first running of the gas turbine engine.

* * * * *